(12) United States Patent
Rostedt et al.

(10) Patent No.: US 11,703,437 B2
(45) Date of Patent: Jul. 18, 2023

(54) METHOD AND APPARATUS FOR MONITORING PARTICLES

(71) Applicant: Pegasor Oy, Tampere (FI)

(72) Inventors: Antti Rostedt, Tampere (FI); Jorma Keskinen, Tampere (FI); Erkka Saukko, Tampere (FI); Kauko Janka, Tampere (FI)

(73) Assignee: PEGASOR OY, Tampere (FI)

( * ) Notice: Subject to any disclaimer, the term of this patent is extended or adjusted under 35 U.S.C. 154(b) by 618 days.

(21) Appl. No.: 16/629,857

(22) PCT Filed: Jul. 13, 2018

(86) PCT No.: PCT/FI2018/050547
§ 371 (c)(1),
(2) Date: Jan. 9, 2020

(87) PCT Pub. No.: WO2019/012185
PCT Pub. Date: Jan. 17, 2019

(65) Prior Publication Data
US 2021/0140868 A1 May 13, 2021

(30) Foreign Application Priority Data

Jul. 14, 2017 (FI) .................................. 20177085
Feb. 12, 2018 (FI) .................................. 20187021

(51) Int. Cl.
*G01N 15/06* (2006.01)
*B03C 3/017* (2006.01)
(Continued)

(52) U.S. Cl.
CPC ......... *G01N 15/0656* (2013.01); *B03C 3/017* (2013.01); *B03C 3/41* (2013.01); *B03C 3/49* (2013.01); *G01N 2015/0046* (2013.01)

(58) Field of Classification Search
CPC ........ G01N 15/0656; G01N 2015/0046; B03C 3/017; B03C 3/41; B03C 3/49
See application file for complete search history.

(56) References Cited

U.S. PATENT DOCUMENTS 5,350,922 A * 9/1994 Bartz .................... G01N 21/49
250/575
5,922,976 A * 7/1999 Russell ................. G01N 15/02
73/865.5

(Continued)

FOREIGN PATENT DOCUMENTS

EP 1540308 6/2005
EP 2853882 4/2015

(Continued)

OTHER PUBLICATIONS

"Marko Majamaki, J. Aerosol Sci. vol. 31, No. 2, pp. 249-261, 2000" (Year: 2000).*

(Continued)

*Primary Examiner* — Alexander Satanovsky
*Assistant Examiner* — Sharah Zaab
(74) *Attorney, Agent, or Firm* — Leason Ellis LLP

(57) ABSTRACT

The invention relates to a method and an apparatus for measuring particle concentrations in an aerosol. The apparatus comprises means (103) for driving flow (105) into apparatus (101), means (115) for electrically charging particles (109) to become electrically charged particles (123) by ions (113) produced by a charger, means (117) for removing free ions (113) which are not attached to the electrically charged particles (123), and means (119) for measuring electrical current carried by the electrically charged particles (123). The means (115) for charging the particles and the means (119) for measuring electrical current carried by the electrically charged particles (123) are dimensioned such that the means (119) for measuring electrical current carried (Continued)

by the electrically charged particles (123) only measures a part of a total current carried by the particles.

16 Claims, 13 Drawing Sheets

(51) Int. Cl.
*B03C 3/41* (2006.01)
*B03C 3/49* (2006.01)
*G01N 15/00* (2006.01)

(56) References Cited

U.S. PATENT DOCUMENTS

| | | | |
|---|---|---|---|
| 6,401,520 B1 * | 6/2002 | Volkwein | G01N 15/0618 73/863.22 |
| 6,965,240 B1 * | 11/2005 | Litton | G01N 27/62 324/448 |
| 7,549,318 B2 | 6/2009 | Burtscher et al. | |
| 2004/0080321 A1 * | 4/2004 | Reavell | B03C 3/41 324/458 |
| 2004/0200265 A1 * | 10/2004 | Eden | G01N 15/0266 73/23.31 |
| 2008/0302666 A1 * | 12/2008 | Benner | G01N 15/0266 204/645 |
| 2010/0001184 A1 | 1/2010 | Chen et al. | |
| 2010/0269600 A1 | 10/2010 | Marra | |
| 2011/0126712 A1 * | 6/2011 | Gefter | B03C 3/155 96/60 |
| 2011/0220790 A1 | 9/2011 | Sun et al. | |
| 2017/0115198 A1 | 4/2017 | Niemelä et al. | |

FOREIGN PATENT DOCUMENTS

| | | | | |
|---|---|---|---|---|
| EP | 3255407 | | 12/2017 | |
| WO | WO 2009109688 | | 9/2009 | |
| WO | WO2017077190 | * | 9/2013 | G01M 15/10 |
| WO | WO 2017077190 | | 5/2017 | |

OTHER PUBLICATIONS

Rostedt, Antti et al. "Modification of the ELPI to measure mean particle effective density in real-time". In: Journal of Aerosol Science, Elsevier, Amsterdam, NL, Sep. 2009, vol. 40, No. 9, pp. 823-831, <DOI:10.1016/j.jaerosci.2009.05.002> abstract; sections 2.1-2.2 and 5; figures 1 and 4.
Rostedt, Antti et al. "Characterization and Response Model of the PPS-M Aerosol Sensor" In: Aerosol Science and Technology, Taylor & Francis, USA, Aug. 2014, vol. 48, No. 10, pp. 1022-1030, <DOI:10.1080/02786826.2014.951023> pp. 1023, 1024, 1026, and 1027.
Rostedt, Antti "Diffusion Charging-Based Aerosol Instrumentation: Design, Response Characterisation and Performance" (doctoral dissertation), Tampere University of Technology, Feb. 23, 2018, vol. 1527, ISSN: 1459-2045 sections 2.2-2.4 and 4.4.
University of Technology, Feb. 23, 2018, vol. 1527, ISSN: 1459-2045 sections 2.2-2.4 and 4.4.

* cited by examiner

METHOD AND APPARATUS FOR MONITORING PARTICLES

CROSS-REFERENCE TO RELATED PATENT APPLICATIONS

This application is a U.S. National Phase Application under 35 U.S.C. § 371 of International Patent Application No. PCT/FI2018/050547, filed Jul. 13, 2018, which claims the priority of Finnish Patent Application No. 20177085, filed Jul. 14, 2017 and Finnish Patent Application No. 20187021, filed Feb. 12, 2018, each of which is incorporated by reference as if expressly set forth in its entirety herein.

BACKGROUND

Field of Invention

The invention relates to a method for measuring particle concentrations in an aerosol. The invention also relates to an apparatus implementing such method. The method and the apparatus can be used in e.g. measuring ambient air quality or indoor air quality. Apparatus is preferably a particle sensor measuring particle mass concentration or particle number concentration or particle (active) surface area concentration or combination thereof. Apparatus can also be utilized in building sensor networks.

Description of the State of the Art

Particles suspended in aerosols play a significant role in ambient and indoor air and in many technical processes. An important task lies in detecting the concentration of the particles by way of measurement technology. Particles in the size range of smaller than 10 micrometers diameter may be breathed in by humans and may have a detrimental effect on health. The most recent research results indicate that the usual protective functions of humans are no longer effective for nanoparticles<100 nm in diameter. Nanoparticles arise mainly in combustion processes such as in motor vehicles, coal-fired power stations, wood heating installations, etc.

The increased awareness of the adverse health effect of the air pollutants has led to a growing need for up to date information on the air quality. This information is usually expressed as an Air Quality Index, which combines the measurement results of different pollutants such as for instance nitrogen dioxide (NO2), ozone (O3) and particulate matter (PM). The combination method may differ from one country to another. Apart from the official air quality measurement sites, there is a growing interest towards sensor networks, which would provide supporting information on the air quality. In such networks the measured information, originated from many measurement nodes scattered over a large area, is collected and processed. As a result, spatially more accurate information is obtained, which could be used to follow the dispersion of pollutants from the emission sources and to support the localized air quality forecasts. GAO et al. A distributed network of low-cost continuous reading sensors to measure spatiotemporal variations of PM2.5 in Xi'an, China. In: Environmental Pollution, 2015, vol. 199, p. 56-65 demonstrates a network of eight low-cost optical sensors for monitoring urban area particle concentrations.

The recent development of low-cost optical particle sensors has made it possible to construct affordable instruments based on the optical particle detection. HOLSTIUS et al. Field calibrations of a low-cost aerosol sensor at a regulatory monitoring site in California. In: Atmos. Meas. Tech. Discuss., 2014, vol. 7, p. 605-632 presents an extensive study on one such instrument in a field conditions. The detectors based on the optical detection rely on the light scattering from a cloud of aerosol particles. Such instruments can be calibrated to give the mass concentration of particles for an aerosol with a constant size distribution, particle density and particle refractive index. This is of course seldom the case. However, the instrument response is a relatively slow function of particle diameter for particles larger than the illumination wavelength, i.e. particles larger than approximately 1 µm.

Electrical aerosol detection methods based on the diffusion charging are a promising starting point, when designing apparatus for the detection of ultrafine particles. The output of the charging process is very repeatable and relatively independent on the particle material. While the charging efficiency drops for the small particles, the sensitivity for particles below 100 nm is still good and far better than in the direct optical methods.

U.S. Pat. No. 7,549,318 B1 (MATTER ENGINEERING), Jun. 23, 2009, describes a method and apparatus for measurement of the number concentration and of the average diameter of aerosol particles. Particles of an aerosol are firstly charged in a unipolar manner in a diffusion charger. They are subsequently led through a diffusional precipitator in which a part of the particles is precipitated. The diffusional precipitator current is measured and a value for the number concentration is evaluated from the current. A single diffusional precipitator may be used for this. According to preferred embodiment, a means for measuring the influence current and/or an aerosol electrometer are additionally present, by way of which one may measure a complete current. The latter additionally permits the evaluation of the average particle size.

The simplest approach for electrical instrument consists of the following components: a diffusion charger, an ion collecting trap, a particle collecting filter inside a Faraday gage, an electrometer to measure the electric current and a pump to provide the sample flow. While forming a perfectly working setup for the particle measurement, the prior art does however have a drawback when considering the application: the aerosol flow through apparatus needs to be controlled or continuously measured. In practice, the sample flow is usually kept constant which leads to an economically unacceptable solution for applications requiring sensors with low cost and low power consumption, e.g solar powered measurement stations.

SUMMARY OF THE INVENTION

The aim of the current invention is to introduce a method and an apparatus which solves at least some of the problems of the prior art, in which solution the response of apparatus is essentially independent on the sample flow rate. The method of the invention is characterized by the features of the independent method claim. The apparatus of the invention is characterized by the features of the independent apparatus claim. Embodiments of the invention are disclosed in the dependent claims.

The problem is thus non-expensive and reliable measurement of particle concentration, especially the measurement of ultrafine (less than 0.1 µm in diameter) particle concentration, in a fluctuating flow. Flow fluctuation may be rising from poor flow generator (like a fan which is sensitive to various parameters such as power voltage and current, changes in front and back pressures, soiling of blades, air density variation, air pressure variation, etc.

The fluctuating flow may also arise from other fluctuating flows, like flow generated by wind or generated by propeller (like in drone, helicopter or airplane), ventilator, extractor, vacuum cleaner, chimney, exhaust tube, intake flow to combustion engine, other combustion system or ventilation channel or similar not originally meant for generating flow through a particle sensor but for some other purpose.

The fluctuating flow may also be generated by a moving object, like balloon, airplane, helicopter, drone, sounding rocket, train, car, motorcycle, bicycle, roller board, boat, ship, horse or some other animal, or any other moving object.

Information on the fluctuating flow received from an outside source, like weather station or weather or air quality model (like Enfuser™ from Finnish Meteorological Institute, FMI) may be used to verify that the flow through the sensor is in operation range and/or to target the sensor to right direction.

The main functional blocks of an apparatus are shown in FIG. 7.

The basic idea of an embodiment is to use the so called mobility analyzer (in this case a simple version called $0^{th}$ mobility analyzer by Tammet, H. F., 1970. The aspiration method for the determination of atmospheric-ion spectra, Israel Program of Scientific Translations, Jerusalem, 1970). As opposite to normal use of this kind of mobility analyzers, the idea is to measure the collected current and use it alone as the measurement result indicating the particle concentration. It's important to find out that only a part of the current carried by charged particles are collected and measured, which is in fact against normal practice related to electrical particle monitors.

The particle size dependent response function ($R_s$) of apparatus, based on particle charging and measurement, by a mobility analyzer, of the electrical current carried by electrically charged particles, gives the measured current for a given particle number concentration, in units of $Am^3$ or, as below $fAcm^3$. The response is the product of the charging efficiency $E_{ch}$ ($fAcm^3$) and the collection efficiency of the mobility analyzer $\eta_{ma}$ (dimensionless) as shown in Equation 1.

$$R_s(d_p) = E_{ch}(d_p)\eta_{ma}(d_p) \quad (1)$$

The response function $R_s$ may also be called as response function of the mobility analyzer $R_{ma}$.

Both factors of the response function in equation 1 are experimentally determined as a function of the particle diameter. In the present design, particles of no diameter range are collected with an efficiency of 100%. In this special case of collecting only a fraction of the particles, the response function can be written e.g. for annular geometry (see e.g. FUCHS The Mechanics of Aerosols, 1964, Oxford Pergamon Press) Equation (1) can be written as $$R_s = \quad (2)$$
$$R_{ma} = P_{ch}(Q_s)n_{ave}(Q_s)eQ_s \frac{2n_{qm}(Q_s)eB}{Q_s} \frac{V_{ma}l_e}{\ln(d_o/d_i)} \approx KP_{ch}(Q_s)n^2(Q_s)B$$

where
$P_{ch}$ is the particle penetration through the charger;
$Q_s$ is the sample flow through apparatus;
$n_{ave}$ is the average number of elementary charges e on a particle;

$n_{qm}$ is the mean charge number on particle;
B is particle mechanical mobility;
$V_{ma}$ is the collection voltage of the mobility analyzer (i.e. electrostatic precipitator) used in apparatus;
$l_e$ is the length of the mobility analyzer's collection electrode;
$d_i$ and $d_o$ are the inner and outer dimensions of the annular slit of the mobility analyzer;
K is constant; and
n is the average charge number per particle ($n \propto n_{ave} \propto n_{qm}$ as long as the charge distribution shape remains unchanged).

As seen in equation 2, the direct effect of the sample flow rate cancels out from the instrument response. This makes the response relatively independent of the flow rate and this does not happen if for any particle size all the particles are collected.

Although the direct flow rate effect is canceled, the product $P_{ch}n^2$ is still in principle dependent on the flow rate. The charged particle losses in the charger decrease with decreasing residence time in the electric field. Therefore, the penetration $P_{ch}$ through the charger is increased with increasing sample flow rate $Q_s$. The penetration as a function of flow rate is usually not a well-defined quantity, but it can be approximated by modeling the charger as a turbulent electrostatic precipitator (ESP). This would lead to flow dependence of the form of $$P_{ch} = 1 - e^{-Q_s/Q_0} \quad (3)$$

Where $Q_0$ is a constant, dependent on the charger design. The value of this function starts from zero at zero flow rate and approaches unity at high flow rates.

On the other hand, the number of elementary charges per particle (n) depends on the product of the residence time and ion concentration in the charger ($N_i t$-product, see e.g. DAVIDSON et. Unipolar Charging of Ultrafine Particles by Diffusion of Ions: Theory and Experiment. In: Langmuir, 1985, Vol. 1, p. 150-158). The $N_i t$-product of the charger decreases with increasing sample flow rate, which leads to decreased particle charging. The dependence of n on $N_i t$ is not completely understood in particle-size range in interest. However, the basic understanding of the nature of the charging mechanism predicts that it's close to logarithmic behavior. Neglecting the changes in the ion concentration one can approximate:

$$n = A \ln(1 + B/Q_s) \quad (4)$$

Where A and B are constants dependent on the charged design. This is a decreasing function as a function of flow rate. The product $P_{ch}n^2$ behaves as a function of flow rate as follows: starting from zero flow rate, the product $P_{ch}n^2$ increases from low values, goes through a maximum and then decreases with increasing flow rate. At the flow rate value producing the maximum, the derivative of the product with respect to flow rate is zero. Within a range of flow rate values close to this value, the product and the response of the whole instrument become independent on the sample flow rate. Compared to the state of the art where $P_{ch}n$ is maximized to optimize sensitivity of an analyzer, optimization for response independence to sample flow is thus surprisingly achieved by maximizing $P_{ch}n^2$.

The invention is based on insights that
The charger is made with significant particle losses, against common convention and state of the art. Furthermore, the collection section is designed to incompletely collect the charged particles, again, against common convention, which seeks to maximize collection to gain highest sensitivity.

This seemingly misdesigned combination of loss-inducing charger and trap preventing 100% collection of even the smallest particles in the mobility analyzer surprisingly makes the response of charger—mobility analyzer combination relatively independent of flow rate, as the direct flow rate components of the response function cancel each other The combination of the turbulent ESP collection and the logarithmic particle charge function of the charger can be scaled to be flow independent over a specific flow rate range, cancelling within this flow rate range also the secondary dependence of the response function on flow rate As the method is good for essentially accurate monitoring of particle concentration with varying sample flows used in the method, the flow may be generated by movement of means where apparatus using the method is attached. Such moving means may be any moving vehicle, e.g. car, bus, airplane, train, ship, balloon or unmanned aerial vehicle. The apparatus based on the method can also be used in applications where apparatus is essentially stationary but air moves around it such as inside a ventilation channel or in any flow generated by chimney effect. The method may also be used in situations where both mechanisms are used for flow generation, such as in cases when air propeller enhances the flow generated by moving means.

Below the method and the apparatus are described in some embodiments. It has to be understood that such embodiments can only describe a brief detail of the possible uses of the method and the flow range may vary from flows in miniature sensors (less than 0.1 litres per minute) to flows in very large ventilation channels (more than 10 000 litres per minute).

The method can be used to monitor particle concentrations in different applications, such as monitoring indoor air quality, ambient air quality and particle emissions.

BRIEF DESCRIPTION OF THE DRAWINGS

In the following, the invention will be described in more detail with reference to the appended principle drawing, in which.

For the sake of clarity, the figures only shows the details necessary for understanding the invention. The structures and details which are not necessary for understanding the invention and which are obvious for a person skilled in the art have been omitted from the figure to emphasize the characteristics of the invention.

DETAILED DESCRIPTION OF PREFERRED EMBODIMENTS

The invented method comprises measuring or monitoring the content of particulate matter in a flowing gas stream. In the method, electrical particle charging is used to charge at least some of the particles in sample flow taken into the measurement apparatus. The electrical current carried by at least some of the charged particles is measured, and thus that is the response of the method. Typical feature of the method is that it can measure the content of particulate matter within +/−10% accuracy when the volumetric flow through the measuring or monitoring apparatus which is measuring or monitoring particulate content in the flowing gas stream has a dynamic range of 10, i.e. with nominal flow, $Q_{sample}$ or $Q_s$, is 1, the flow range is 0.3-3. The term "accuracy" has here the meaning that when the particle concentration is measured with a certain volumetric flow inside the mentioned dynamic range, the same concentration in the sample flow is measured within +/−10% value from the first measurement with another volumetric flow within the same dynamic range. Nominal flow can change widely depending on the sensor design. The tests were mainly carried out by nominal flow of 5 litres per minutes, but the nominal flow can be e.g. 0.5, 50, 500 or 5000 litres per minute as well. Such conditions are achieved e.g. by designing the essential operational parameters, like nominal sample flow through the filter and/or ion production in the electrical charger and constructing the invented apparatus (e.g. mobility analyzer dimensions) in such a way that the flow dependence of the charging efficiency $E_{ch}(Q)$ and the flow dependence of the particle collector collection efficiency $\eta(Q)$ essentially cancel each other, making the response R of the method and apparatus essentially independent of the flow rate through the apparatus, Q.

Figure 1:
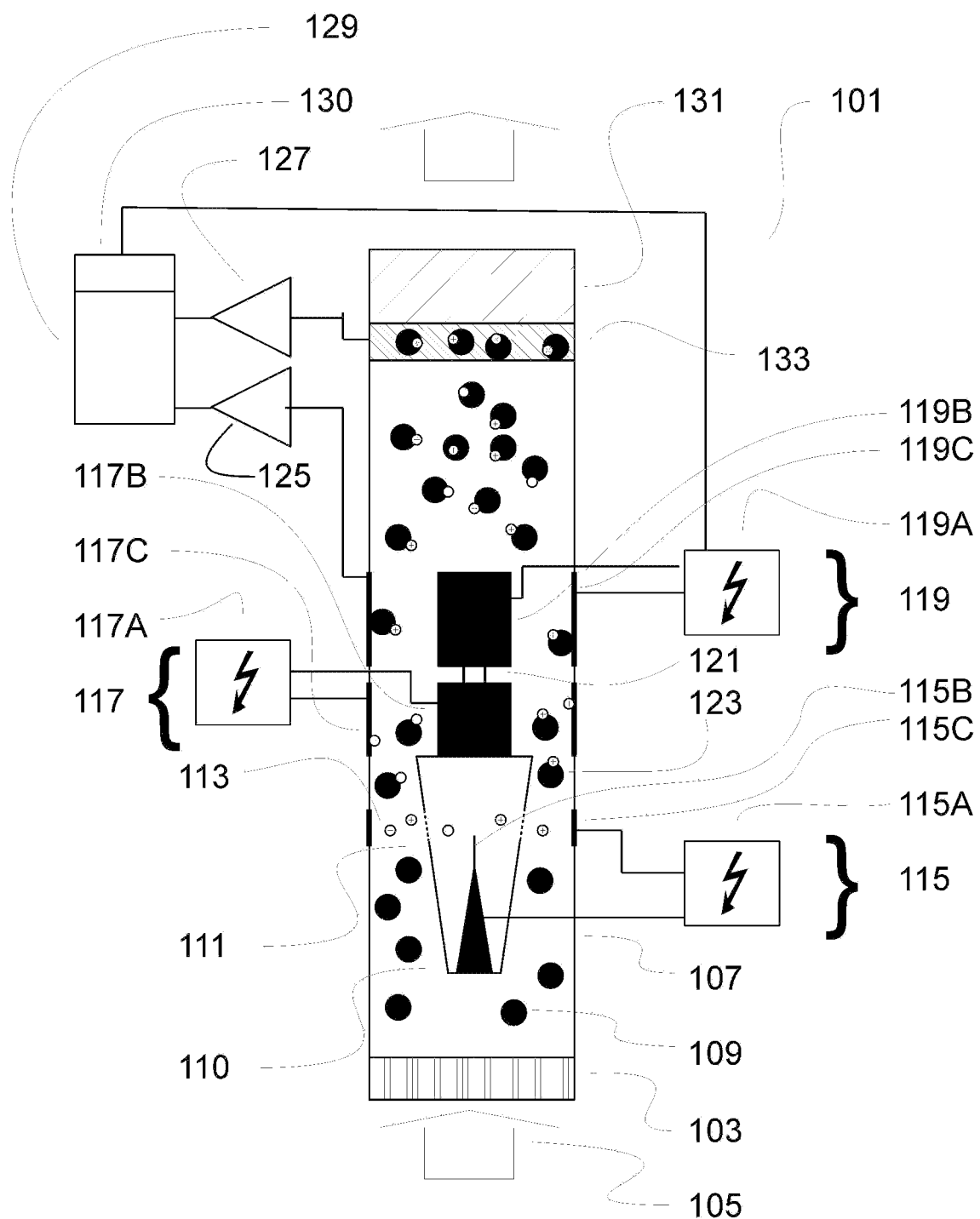
FIG. 1 shows a schematic drawing of an apparatus.

FIG. 1 shows as an example a schematic drawing of one embodiment. Apparatus 101 is used for measuring or monitoring particles 109 in sample flow 105. Apparatus 101 comprises means 103 for driving flow 105 into apparatus 101. In other words, these means 103 can be called sample intake which may be a conventional tube or specially designed intake nozzle, various nozzle types being familiar to a person skilled in the art. Means 103 may also comprise functional elements to treat the sample flow, such as heating it (especially with ambient air measurements), removing volatile elements, such as water from the flow, neutralizing or charging the particles in the flow, etc. For the sake of clarity it is mentioned that means 103 may comprise means for active flow generation such as a blower but if active flow generation is required it is typically realized by means 131 placed downstream of electrical charger 115 and particle analyzer 119.

Apparatus 101 further comprises means 115 for electrically charging particles 109 to become electrically charged particles 123 by ions 113 produced by charger 115. As understood from above, the flow dependency of charging efficiency $E_{ch}(Q)$ is a parameter important for the operation of the invented method and apparatus. Thus the method and apparatus may comprise method and means for controlling the charging efficiency $E_{ch}$, although this is not shown in FIG. 1.

Apparatus 101 further comprises means 117 for removing the free ions 113 which are not attached to particles 109 before the electrical charge carried by at least a fraction of charged particles 123 is measured. Typically the free ion removing means 117 is an electrical precipitator comprising voltage source 117A and ion trap created by electrical field between electrodes 117B and 117C. Ion trap can, however, be based on other mechanisms collecting free ions 113, e.g. due to their higher diffusion coefficient as compared to particles 109 and charged particles 123. If required, the electrical current generated to the collecting surface by free ions attaching on it may also be measured.

Apparatus 101 further comprises means 119 for collecting a fraction of charged particles 123. The electrical current generated by the collected electrical charge on the fraction of collected electrically charged particles 123 is measured by means 125, typically by an electrometer. FIG. 1 shows the collection method for a fraction of charged particles to be an electrostatic precipitator but it may as well be any device based on particle properties such as a diffusion-based collector combined to electrical charge monitoring means 125.

Apparatus 101 further comprises means 127 for measuring electrical current/charge carried by essentially all charged particles 123. Such measurement may be based on collecting essentially all charged particles 123 on a conductive filter 133 and measuring the charge collected on filter 133 by means 127 (on other words measuring the electrical current generated by collected charge with an electrometer). The total electrical charge/current measurement may also be based e.g. on measuring the escaping current as described in e.g. EP 2 247 939 B1 (PEGASOR), 22 Apr. 2015. The same patent describes a way to generate the intake flow by using an ejector which may be applied with the current invention.

Apparatus 101 further comprises means 129 for comparing the electrical charge 125 detected in the means 119 collecting a fraction of charged particles 123 to electrical charge 127 generated by essentially all charged particles 123 and means 130 which are connected to the comparison means 129 and which are used to control collecting means 119 so that collecting means 119 collects less than a certain fraction of electrically charged particles 123.

If collecting means 119 is an electrostatic precipitator, collection efficiency can be controlled by adjusting the electrical field strength generated by voltage source 119A and electrodes 119B and 119C, which generate the electrical field between them, of the electrical precipitator 119. If collections means are e.g. a diffusion-based collector, the collection efficiency can be adjusted by adjusting volumetric flow through the collector (note that excess clean air flows can be used in addition to the sample flow) or by adjusting the physical parameters of the diffusion-based collector such as the surface area or the length of the collector.

The description above describes the method and the apparatus when it is used in DC mode. It can as well be used in AC mode by modulating a suitable parameter such as the electrical field strength of means 119 (when it is an electrostatic parameter), modulating the volumetric flow or the physical parameters of the diffusion-based collection unit 119 or modulating the electrical charger 115. In AC mode problems, typical in DC-mode measurement can be avoided which is obvious for a person skilled in the art.

Apparatus 101 may also comprise means 110 for separating charger mechanically from the particle-polluted sample flow 105 flowing inside the outer wall 107 of apparatus 101. Grid 111 ensures in this case ion 113 flow from charger to particles 109.

The atmosphere inside separating means 110 may be different from atmosphere inside apparatus 101. This may be actively generated by e.g. directing essentially pure air or other suitable gas inside separating means 110 and generating positive pressure inside means Free ion remover 115 is in one embodiment of the invention an electrostatic precipitator comprising preferably adjustable voltage source 115A and electrodes 115B and 115C between which electrical field is formed.

In one embodiment of the invention, free ion remover 115 and charged particle remover 119 are connected to the same central axis 121 of apparatus 101. Means 119 removing fraction of charged particles 123 comprises an electrostatic precipitator comprising preferably adjustable voltage source 119A and electrodes 119B and 119C between which electrical field is formed.

Figure 2:
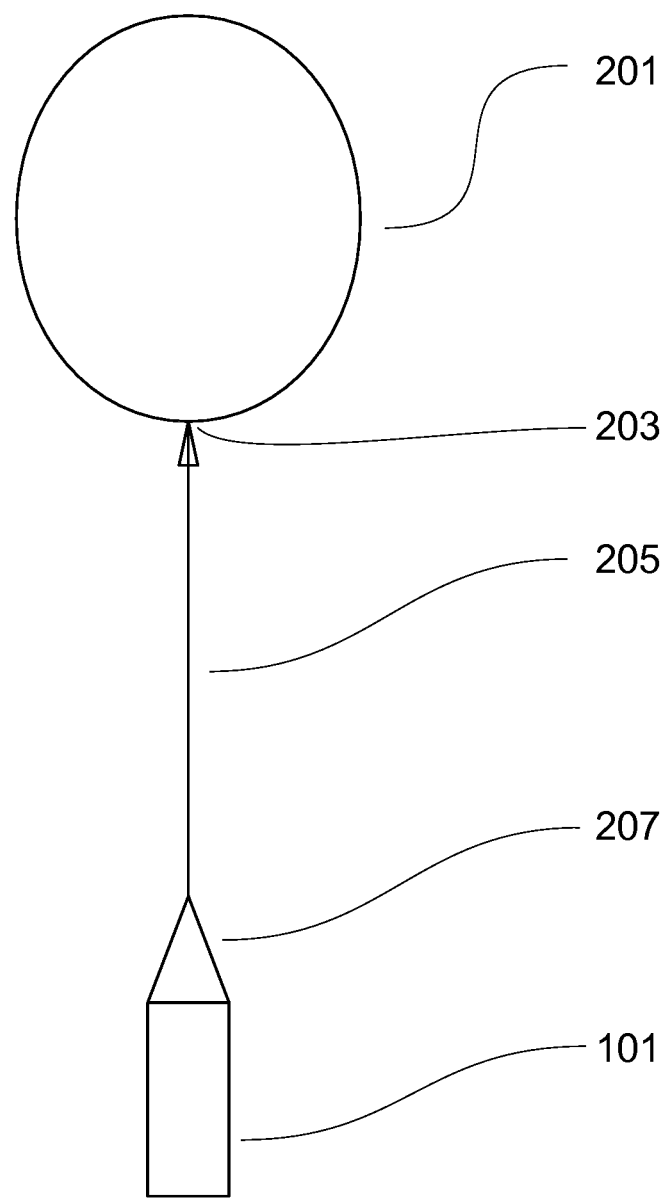
FIG. 2 shows an embodiment where the presented method or apparatus is used to measure particle concentration in various vertical points, the movement of the apparatus and thus the sample flow to the apparatus is generated by a moving balloon.

Invented apparatus 101 can be constructed to be lightweight as there is no absolute need for means of generating flow 131. Apparatus 101 can be installed to a moving object/means such as car, train, ship, airplane or equivalent. FIG. 2. shows apparatus 101 being installed by fixing means 203, 205 and 207 to a balloon 201 and the essentially vertical movement of balloon 201 (either up or down) generates flow through apparatus 101.

Figure 3:
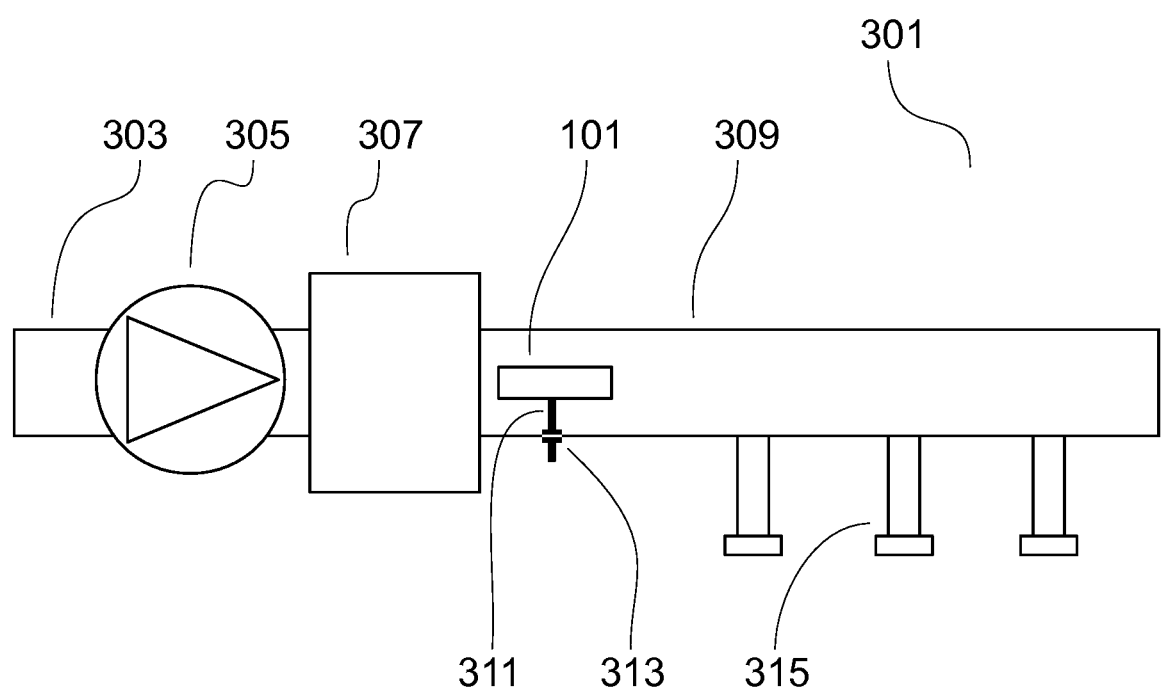
FIG. 3 shows an embodiment where the method or apparatus is used inside a ventilation channel.

Flow through apparatus 101 can also be realized without means of generating flow 131 even if apparatus 101 is stationary. FIG. 3 shows an embodiment where apparatus 101 is placed inside ventilation channel 309. With ventilation channel there are basically three different measurement points: inlet (outdoor air), after the filters (purified air) and from the room (outlet, recirculation channel). Movement of intake air 303, generated by blower 305 and preferably filtered, heated or cooled by treatment unit 307 generates the necessary flow through apparatus 101 fixed into channel 309 by fixing means 311 and 313. The air from ventilation channel 309 is distributed through output terminals 315.

Figure 4:
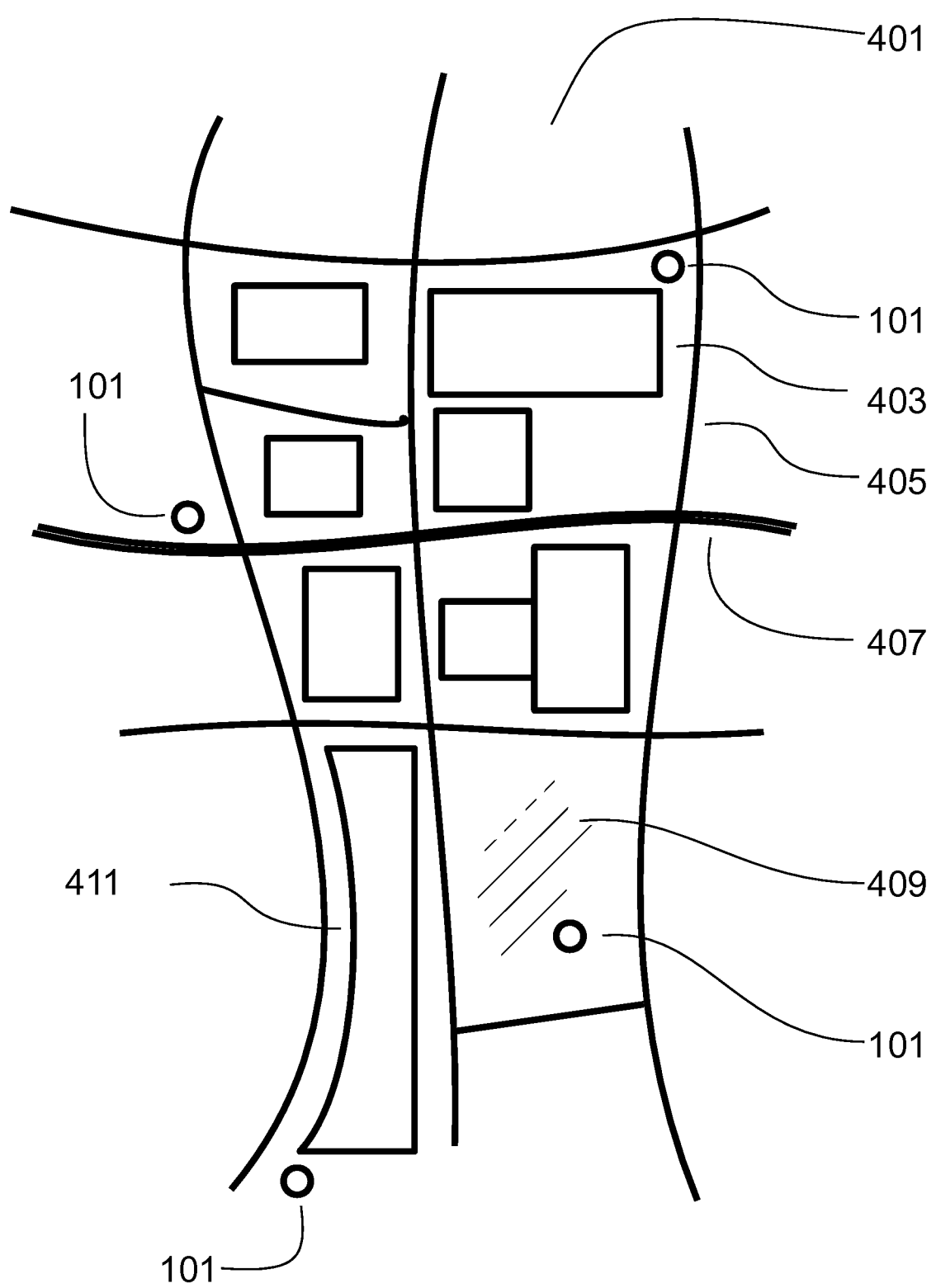
FIG. 4 shows an embodiment where the method or apparatus is used within a sensor network to measure ambient air quality.

One essential goal of the invention is to produce apparatus 101 which is low-cost and can thus be used in sensor networks. Such embodiment is shown in principle in FIG. 4 where urban area 401, comprising e.g. residential building 403, streets 405, highways 407, parks 409 and factories 411 are measured by apparatus 101 distributed widely into the urban area 401. The measurement data from apparatuses 101 is preferably sent wirelessly into a cloud system and the data is analyzed and combined to provide a spatially accurate information in the air quality of the urban area. Such function can be carried out e.g. by Enfuser™ software developed by Finnish Meteorological Institute, FMI. Sensor network in urban area 101 may comprise various different pollutant sensors in addition to apparatus 101, such as sensors for pollutant gases (e.g. $O_3$, $SO_x$, $NO_x$), weather-related sensors (rainfall, wind direction, wind speed), noise sensors, traffic density sensors, etc.

Figure 5:
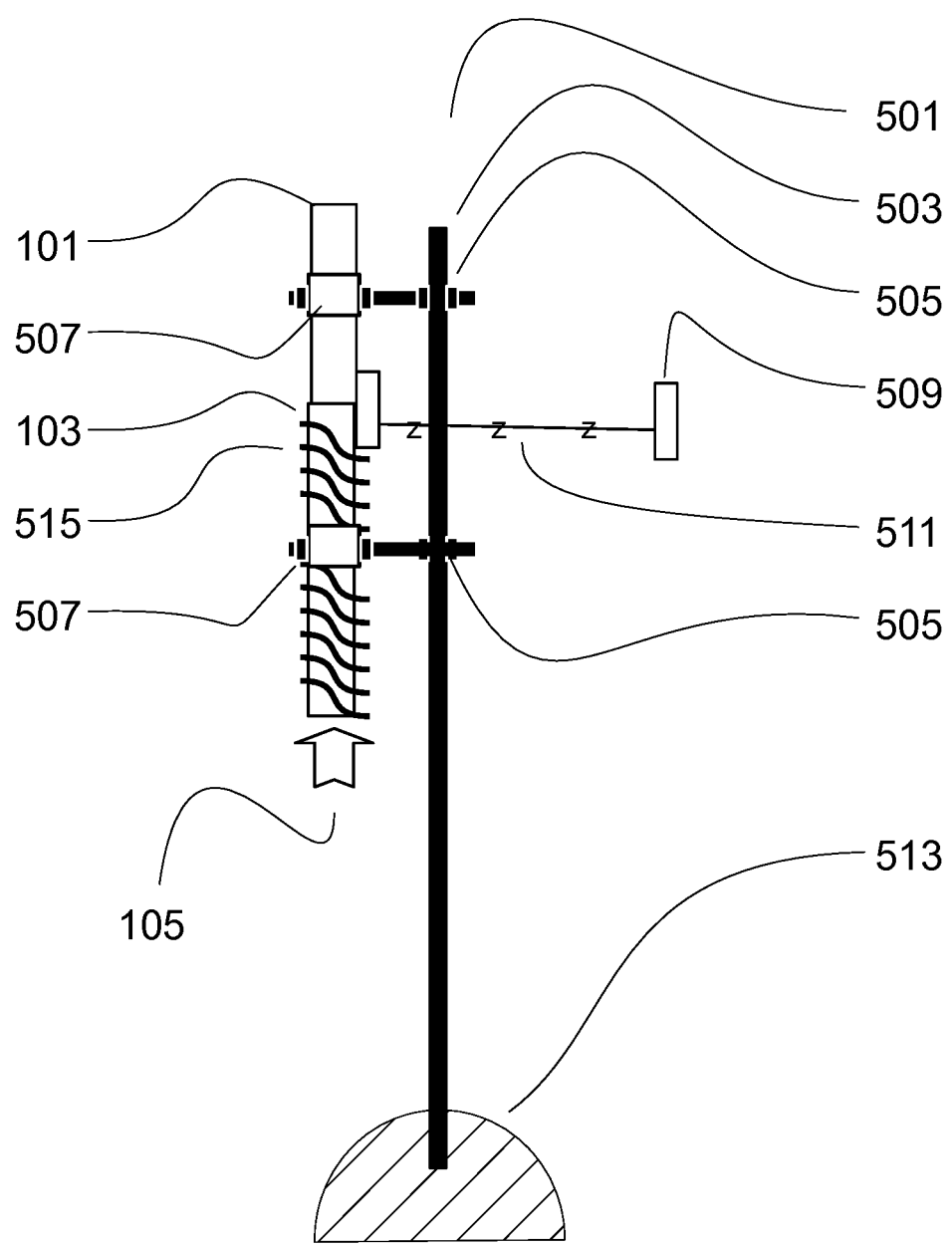
FIG. 5 shows an example of ambient air measurement pod.

In urban networks and in other ambient measurements apparatus 101 can be fixed e.g. to measurement pod show in FIG. 5, 501. Bar 503 is fixed to ground 513 and apparatus 101 is fixed to bar 503 via fixing means 505 and 507. Flow intake means 103 of apparatus 101 may comprise heater 515 to heat sample flow 105 to 10-40° C. higher than the ambient temperature. The measured signal is sent to a wireless unit 509 via cable 511 and sent wirelessly e.g. to cloud server.

Figure 6:
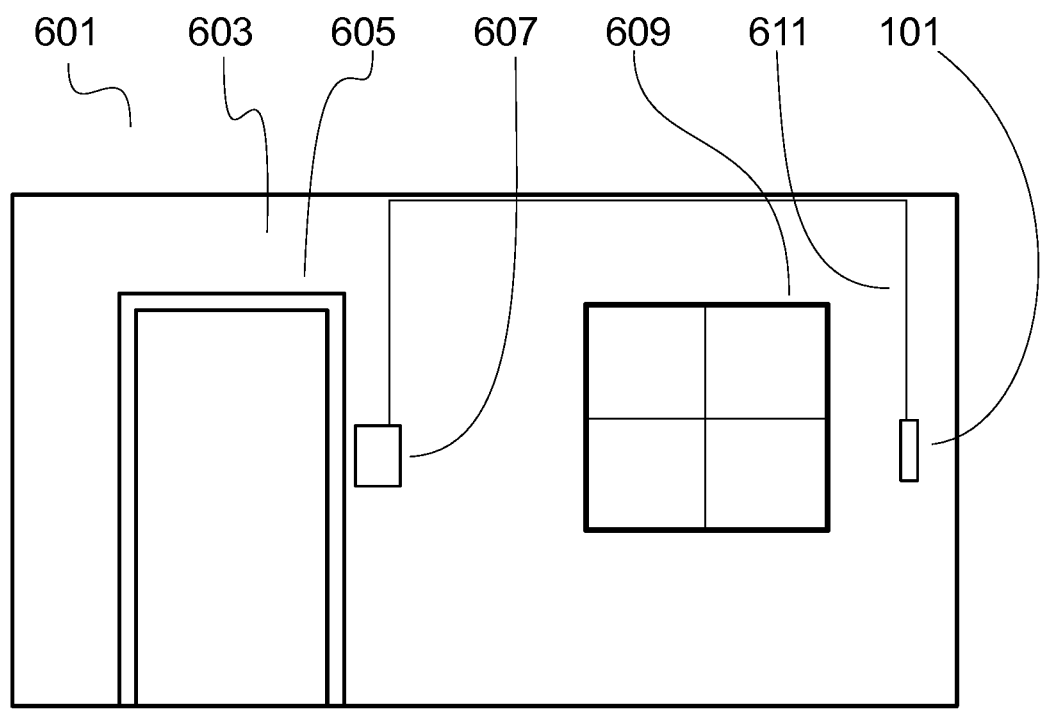
FIG. 6 shows an example of indoor air quality measurement and display.
Figure 7:
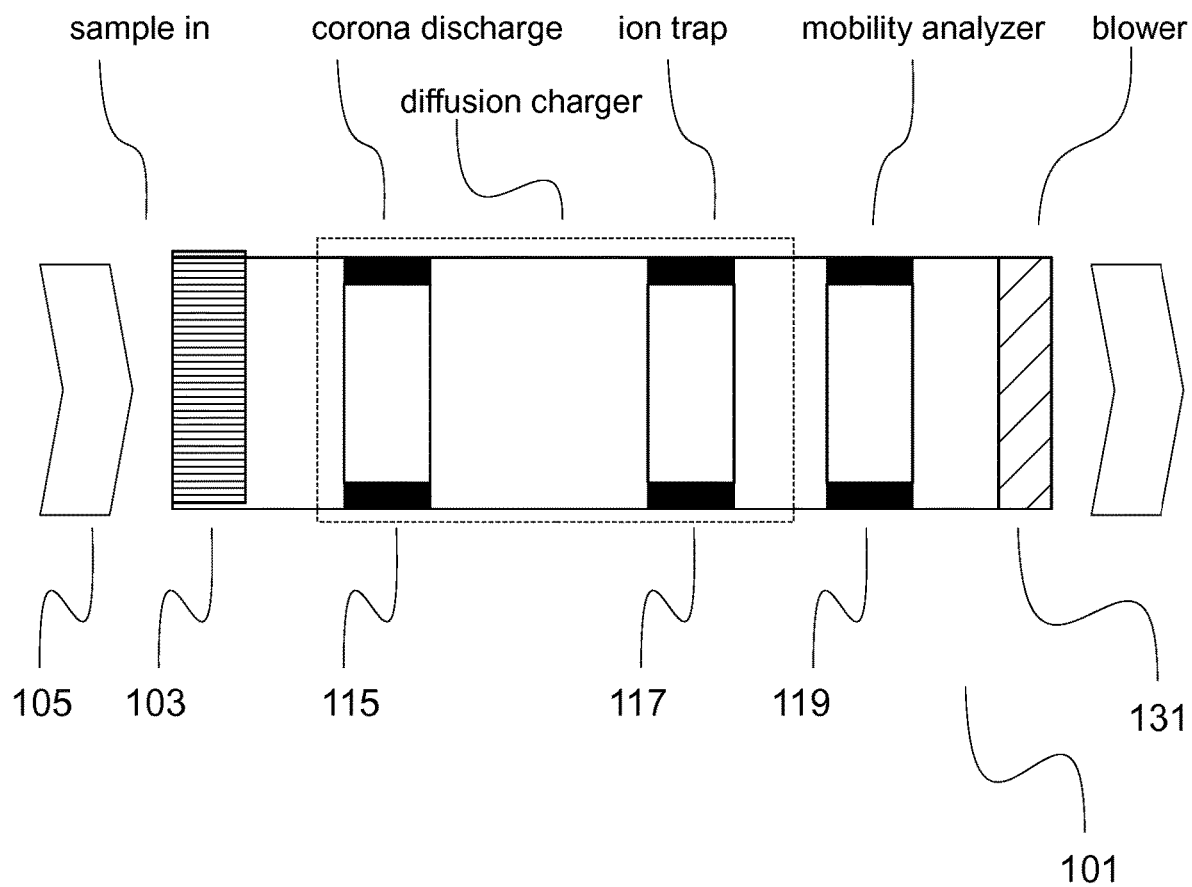
FIG. 7 shows functional blocks used in the presented method and in the apparatus.

Apparatus 101 can further be used in indoor air measurement 601, shown in FIG. 6. Apparatus 101 is fixed to indoor area which is surrounded e.g. by wall 603, door 605 and window 609. Apparatus 101 is connected to display unit 607 either by cable 611 or wirelessly. Apparatus 101 and display 607 may be installed away from each other. The measurement signal can also be sent to a cloud system from which the raw or analyzed/synthesized data can be sent to a separate display unit, like tablet, mobile phone or equivalent.

Figure 8:
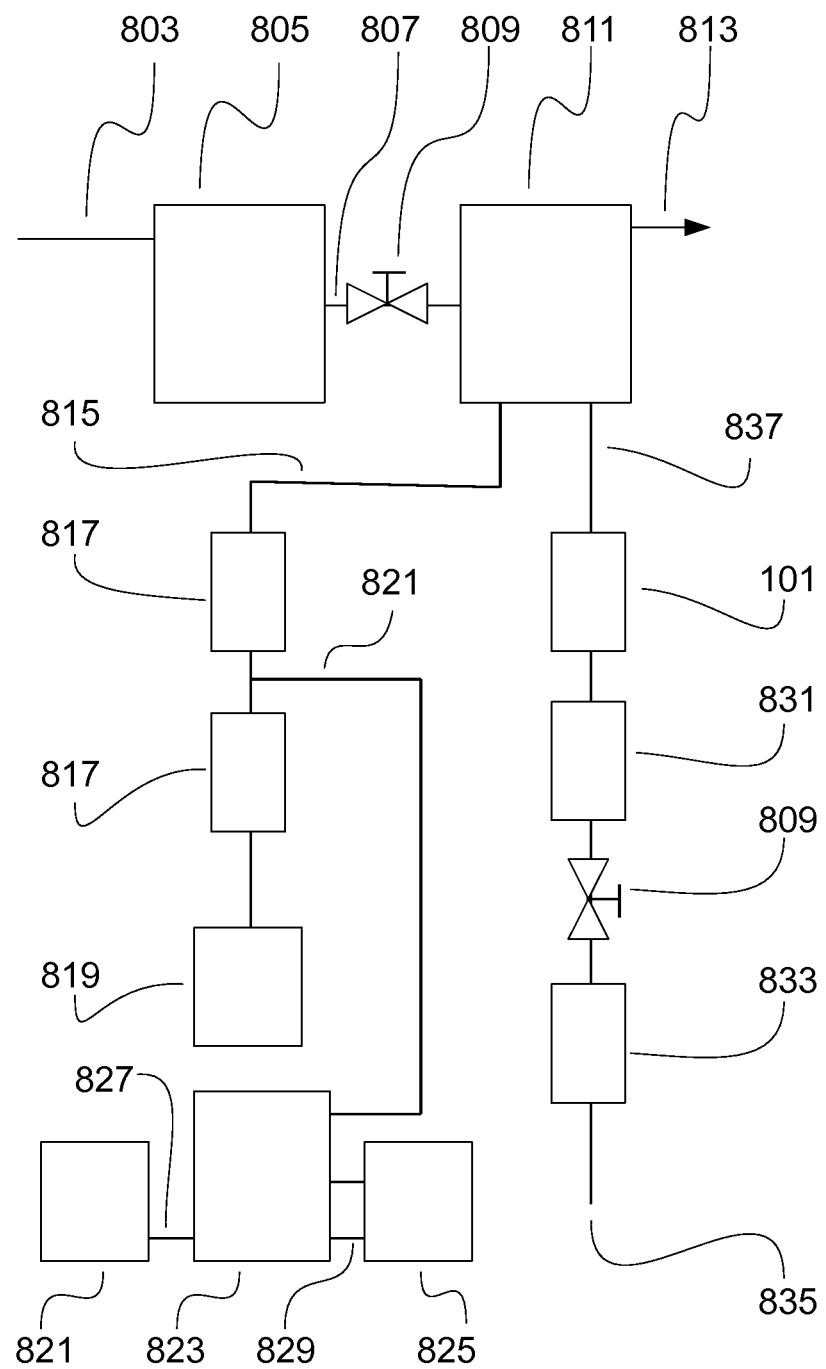
FIG. 8 clarifies the functional blocks of the method and apparatus.

The sensitivity of the response function R to flow rate Q was tested with polydisperse laboratory test aerosol using different sample flow rates in the range of 10-60 liters per minute (lpm). The used measurement setup is shown in FIG. 8. As the aerosol generator 805 using pressurized air entering via line 803, an evaporation condensation generator described by LEE et al. An Aerosol Generator High Stability. In: Am. Ind. Hyg. Assoc. J., 1975, vol. 36, p. 861-865, was used, using dioctyl sebacate (DOS) as particle material. Like in the monodisperse test measurements, the aerosol was generated to a mixing chamber 811 connected to aerosol generator via line 807 and valve 809. Sample was diluted in mixing chamber 811 with filtered pressurized air (not shown in picture). The dilution air feed was kept constant and it exceed the maximum flow rate needed for the prototype and the reference instruments, which made it possible to vary the prototype apparatus flow rate without affecting the particle size or the concentration. The excess flow 813 from the mixing chamber was led to the ventilation. During the measurements, the test aerosol size distribution median size ($d_m$) was varied between 35-340 nm, while the geometric standard deviation (GSD) varied between 1.3 and 1.6. The size distribution was measured using Scanning Mobility Particle Sizer Spectrometer (SMPS) 823, consisting of a model 3071 Differential Mobility Analyzer (DMA, TSI Inc.) operated at closed loop setup described by JOKINEN et al. Closed-loop arrangement with critical orifice for DMA sheath/excess flow system. In: J. Aerosol Sci. 1997, vol. 28, 4, p. 643-648, with a flow circulating unit (FCU) 825 connected to SMPS via lines 829 and a model 3775 Condensation Particle Counter (CPC, TSI Inc.) 821 connected to SMPS via line 827. A Water Condensation Particle Counter (WCPC) 819 model 3786 (TSI Inc.) connected to line 815 exiting from mixing chamber 811 was used to measure the total number concentration to improve the concentration measurement accuracy. In order to dilute the test aerosol concentration to the reference instruments two ejector dilutors 817 were used, one in front of the SMPS 817 and two in front of the WCPC 819. The corresponding dilution ratios were 8.2 for the SMPS and 78 for the WCPC. The sample flow through apparatus 101 was controlled in the manner as in the monodisperse response measurements. Apparatus 101 which was connected to mixing chamber 811 via line 837 was further connected to vacuum line 835 via filter 831, valve 809 and mass flow controller 833.

Figure 9:
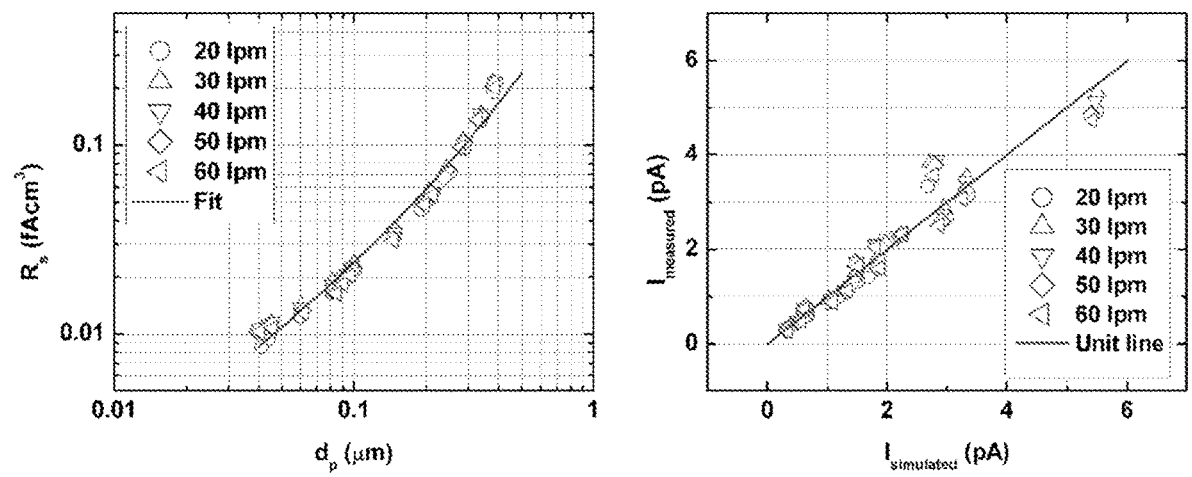
FIG. 9 shows measurement results from one embodiment of the invention.

FIG. 9 shows the measured and simulated test values. On the left side of FIG. 6, apparatus response in polydisperse test measurements is shown (both measured and fitted responses shown). The measured values are plotted as the function of the particle size representing the mean response over the number size distribution. On right, the correlation plot between the simulated and measured apparatus outputs is shown. As seen from FIG. 9, the response of apparatus 101 remains nearly independent on the sample flow rate in the range of 20-60 lpm.

Figure 10:
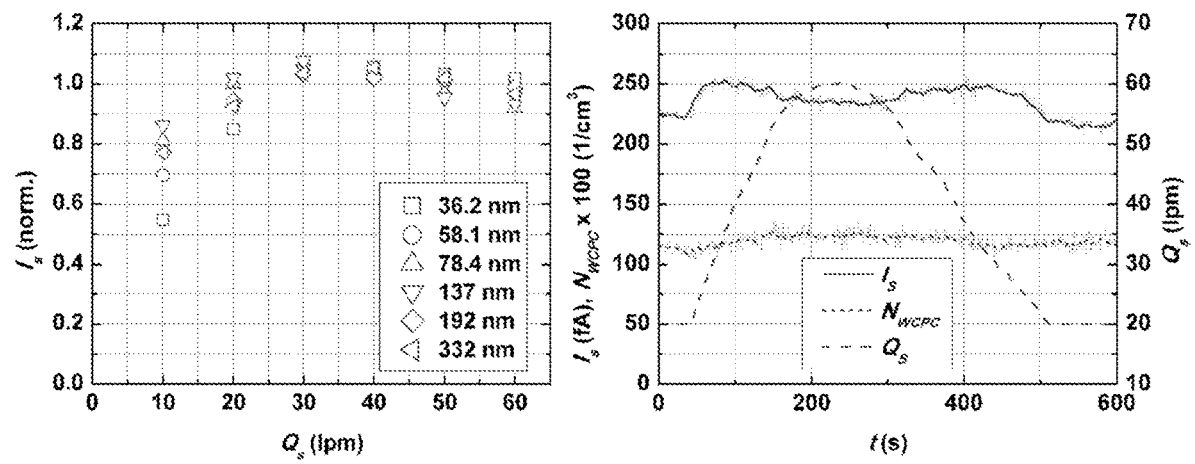
FIG. 10 demonstrates flow independence of the presented method and apparatus.

The flow rate independence of the measured response is further demonstrated in FIG. 10. On the left hand side, the normalized response of apparatus 101 is plotted against the sample flow rate for different particle size distributions. As seen on the left in FIG. 10, the apparatus response remains nearly constant for the sample flow rate range from 20 lpm to 60 lpm. On the right hand side, in FIG. 10, is plotted the apparatus output and the measured number concentrations during a ramp in the sample flow rate. During the flow ramp, the aerosol generation was kept constant, however the median size degreased steadily from 83 nm in the beginning to 79 nm at the end. This is seen as a slight change in the apparatus 101 signal when comparing the signal level in the beginning and the end of the flow ramp. Despite this, the apparatus 101 signal is staying within 10% of the average level during the experiment.

Figure 11:
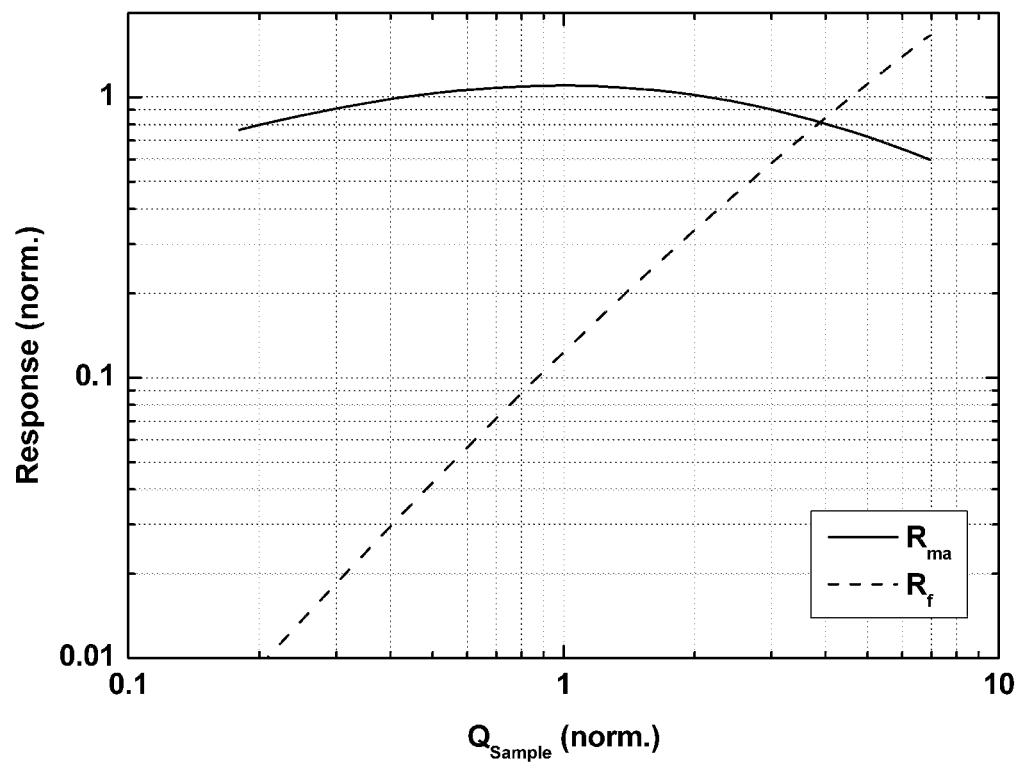
FIG. 11 shows the response function Rms of one embodiment of the invention, showing the dynamic range of 10 with +/−10% accuracy.

FIG. 11 Shows the calculated response function for one embodiment of the invention. It shows, with logarithmic scaling, that the accuracy of the equipment 101 is within +/-10% when the dynamic range of the equipment is 10, i.e. flow is 0.3-3 when the nominal flow is 1. The result of the invented method and apparatus is shown as response function curve of the equipment, $R_{ma}$. The other curve, $R_f$, shows the calculated response curve for a prior-art construction with particle charging and filter capture. The difference on the sensitivity of the response curve to flow rate $Q_{sample}$ has an outstanding difference between the prior-art and invented method.

A particular embodiment had a nominal flow of 5 litres per minute and thus the flow range where the accuracy of equipment 101 was +/-10% was 1.5-15 litres per minute.

Figure 12:
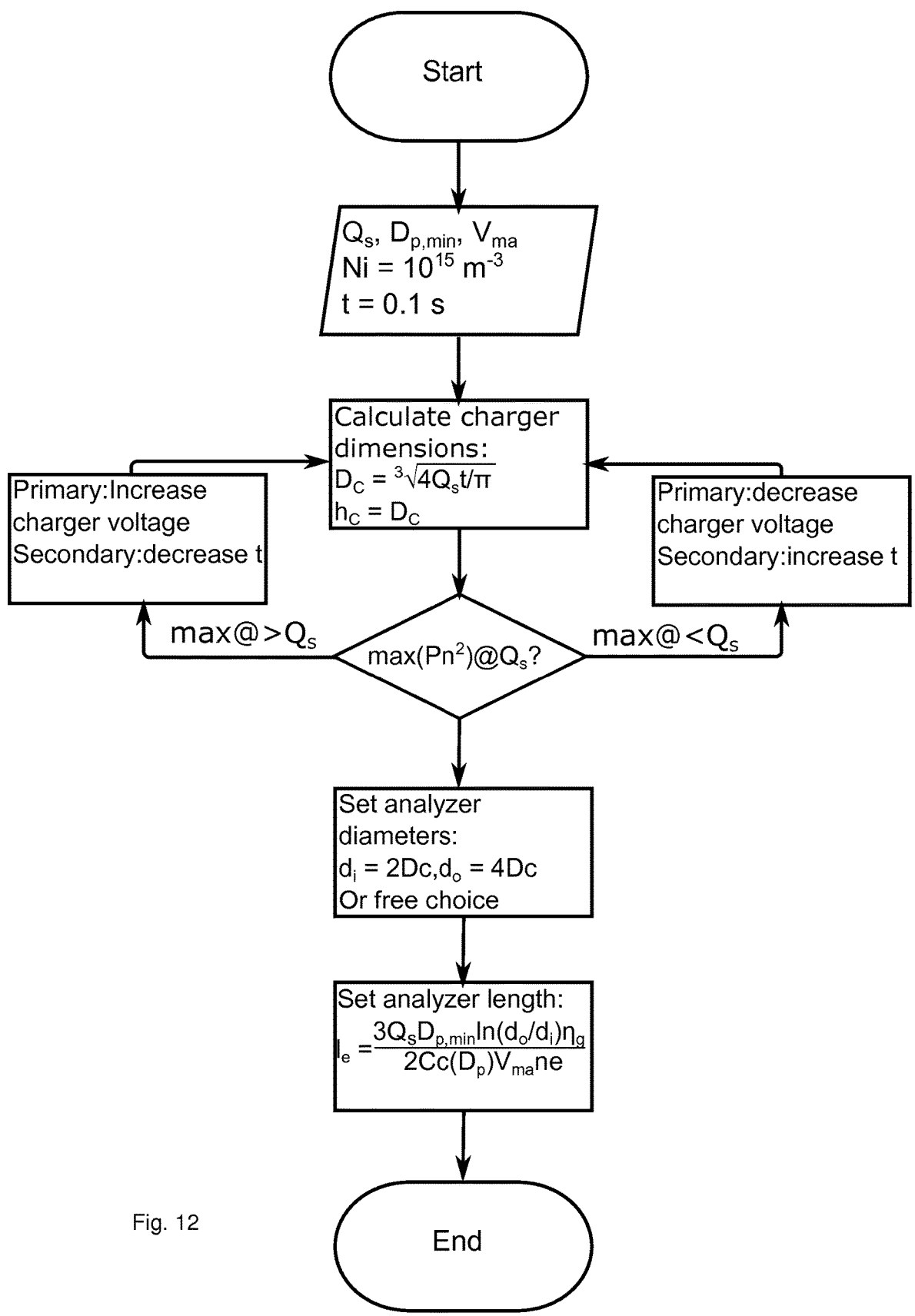
FIG. 12 shows a block diagram of dimensioning an apparatus.

The design procedure relating to the charger and the analyzer are explained with reference to the FIG. 12. In FIG. 12 the following terms and symbols are used:

Qs=Flow rate
Dp, min=minimum particle size
Vma=mobility analyzer voltage
Ni=mean ion concentration in charger
t=residence time in charger
$D_c$=charger diameter
$h_c$=charger length
P=particle penetration through charger
n=number of elementary charges on a particle
$d_i$=inner diameter of annular analyzer
$d_o$=outer diameter of annular analyzer
$l_e$=analyzer length
$\eta_g$=viscosity of carrier gas
$C_c(D_p)$=slip correction factor
e=elementary charge Example Design Procedure The given starting values for the sensor are the sample flow rate Qs, desired minimum particle size of interest Dp min, charger produced ion concentration starting value, Ni and residence time inside the charger, t, and weakly bound mobility analyzer voltage $V_{ma}$. In this example, the volume flow is given, but in different applications, the available pressure difference or gas velocity may be given. In these cases the resulting volume flow may be iteratively computed or experimented. The ion exposure Nit is a best estimate for a corona charger in the middle of normal operating range. Based on the residence time, the diameter of the cylindrical charger DC is computed according to:

$D_c=(4Q_s t/\pi)^{1/3}$

The length of the charger, hc is preferably the same. This sets the residence time in the desired value.

Figure 13:
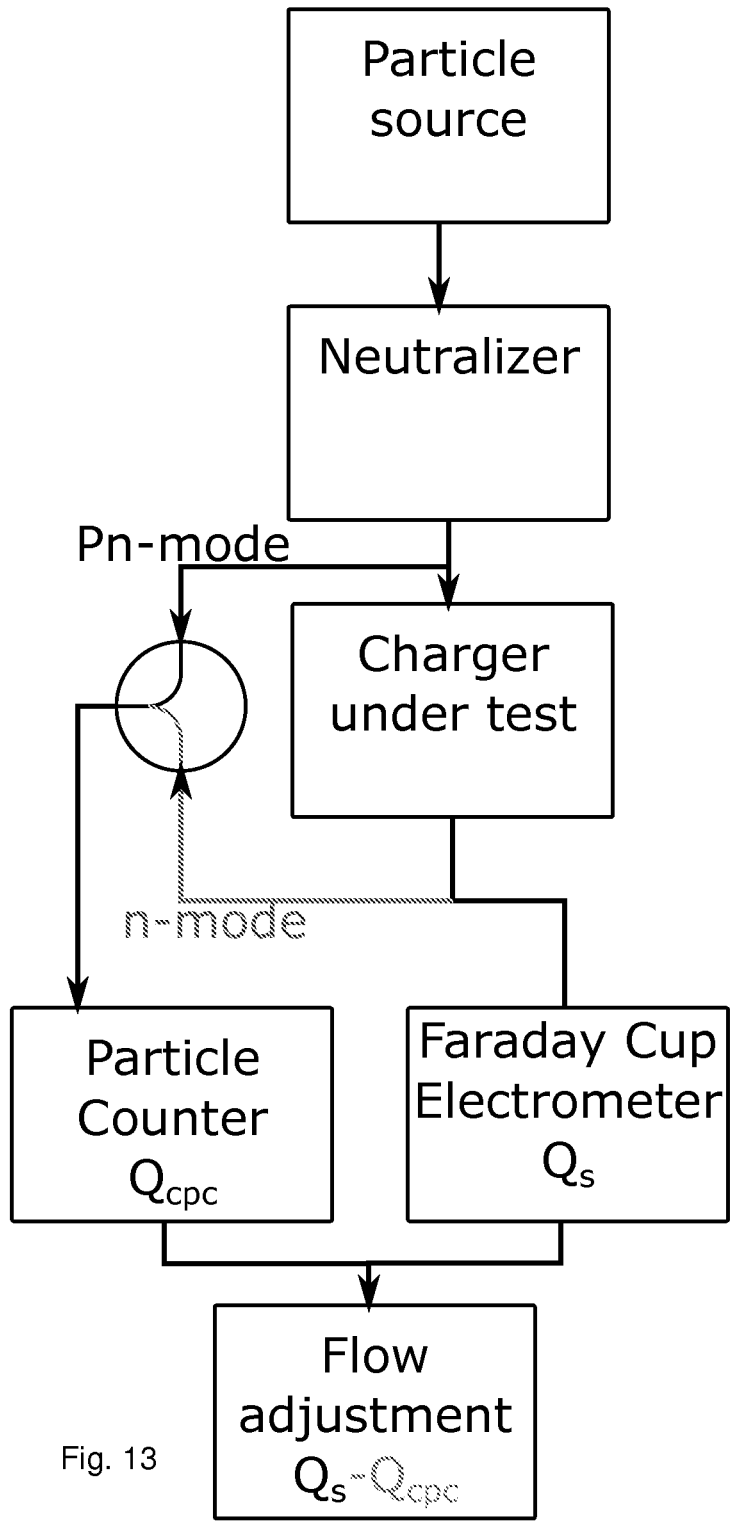
FIG. 13 shows a block diagram of a measurement of collection efficiency and median charge number.

Next, a measurement of the collection efficiency P and median charge number n is done. This is done according to FIG. 13, where particles of known diameter are produced (as disclosed by Yli-Ojanperä, J., Mäkelä, J. M., Marjamäki, M., Rostedt, A., and Keskinen, J. (2010). Towards Traceable Particle Number Concentration Standard: Single Charged Aerosol Reference (SCAR). J. Aerosol Sci., 41:719-728, for example). The particles are neutralized e.g with a radioactive bipolar neutralizer, after which particles are sampled (in Pn-mode) by a particle counter, e.g condensation particle counter (CPC). Rest of the sample is directed through the charger and the charge carried by the penetrated particles are measured with a Faraday cup electrometer. The ratio of the acquired charge per air volume divided by the particles counted by the particle counter gives the product of penetration and mean charge, Pn. Next the system is set to n-mode, where everything else being equal, the sampling point for the particle counter is changed to be parallel to the Faraday cup electrometer. Computing again the ratio of concentrations gives the mean charge per particle, n. Computing the product of these two gives the Pn$^2$. This procedure is repeated in the expected flow rate range of the charger and the maximum point of Pn$^2$ is determined relative to Qs through the charger.

If the maximum of product Pn$^2$ is below the set nominal flow rate Qs (less than 0.5 of the nominal flow rate), the charger efficiency can be adjusted by reducing the charger voltage (decreasing losses) or by increasing the residence time by increasing the size of the charger. In case the maximum is above the set point (more than 2 of the nominal flow rate), opposite changes are effected to adjust the peak of the Pn$^2$ product to the nominal sample flow. The precision of the adjustment needs to be within 0.5 to 2 of the nominal sample flow to still fulfill the flow independence in flow range in similar flow range relative to nominal (FIG. 11). In case the charger voltage and diameter adjustments are not sufficient to reduce the $P_{ch}$ to appropriate level it is also possible to add an additional electrostatic ion trap, independently adjustable relative to the charger voltage. The adjustment of the voltage in relation to the peak of the Pn$^2$ product is the same as described for the charger voltage.

After this adjustment, the analyzer diameters are set, preferably such that the cross section of the sample passage is increased or kept the same. According to an embodiment, for a cylindrical analyzer the inner diameter of the analyzer is two times the charger diameter and outer diameter of the analyzer four times the charger diameter.

After this the final dimension is the analyzer maximum length, which can be calculated according to:

$le=3Q_s D_{p,min} \ln(d_o/d_i)\eta_g/(2Cc(D_p)V_{ma}ne)$

This provides necessary conditions of both the lossy charger and incomplete collection by the analyzer section, which provide the optimal flow independence.

After this procedure, the design is complete.

It is possible to produce various embodiments of the invention in accordance with the spirit of the invention. Therefore, the above-presented examples must not be interpreted as restrictive to. the invention, but the embodiments of the invention can be freely varied within the scope of the inventive features presented in the claims hereinbelow.

The invention claimed is:

1. Method for measuring or monitoring the content of particulate matter suspended in carrier gas, sampled with sample volume flow rate, the method comprising electrical particle charging of at least some of the particles in the same sample flow, collecting at least some of the charged particles using electrostatic force in the same sample flow and measuring the electrical current carried by at least some of the charged particles, wherein flow sensitivity is minimized such that the charging and collecting are dimensioned by maximizing Pchn2, where Pch=particle penetration through charger and n=number of elementary charges on a particle, such that the current carried by the particles collected is measured and the said current is only part of total current carried by the charged particles.

2. Method of claim 1, wherein maximizing Pchn2 is performed by adjusting at least one of amending charging voltage and amending residence time of the particles in the charger.

3. Method of claim 1, wherein the measuring of the electrical current carried by at least some of the charged particles is performed by a mobility analyzer.

4. Apparatus for measuring or monitoring particles in sample flow comprising means for driving flow into apparatus, means for electrically charging particles to become electrically charged particles by ions produced by a charger, means for removing free ions which are not attached to the electrically charged particles, and means for measuring electrical current carried by the electrically charged particles, the means for charging the particles and the means for measuring electrical current carried by the electrically charged particles are dimensioned by maximizing Pchn2, where Pch=particle penetration through charger and n=number of elementary charges on a particle, such that the means for measuring electrical current carried by the electrically charged particles only measures a part of a total current carried by the particles, thereby minimizing flow sensitivity.

5. Apparatus of claim 4, wherein the means for measuring electrical current carried by the electrically charged particles is a mobility analyzer (electrostatic precipitator).

6. Method of claim 1, wherein the method is performed using equipment that is characterized by the dynamic flow range that is 0.3 liter/minute-3 liter/minute when the nominal flow rate is 1 liter/minute.

7. Method of claim 6, wherein maximizing Pchn2 is performed by adjusting at least one of amending charging voltage and amending residence time of the particles in the charger.

8. Method of claim 6, wherein the measuring of the electrical current carried by at least some of the charged particles is performed by a mobility analyzer.

9. Method of claim 2, wherein the measuring of the electrical current carried by at least some of the charged particles is performed by a mobility analyzer.

10. Method of claim 7, wherein the measuring of the electrical current carried by at least some of the charged particles is performed by a mobility analyzer.

11. Apparatus of claim 4, wherein the apparatus is characterized by a dynamic flow range that is 0.3 liter/minute-3 liter/minute when the nominal flow rate is 1 liter/minute.

12. Apparatus of claim 5, wherein the apparatus is characterized by a dynamic flow range that is 0.3 liter/minute-3 liter/minute when the nominal flow rate is 1 liter/minute.

13. Apparatus of claim 4, wherein the charger is cylindrical and has a diameter Dc=(4Qst/π)⅓, where Qs=Flow rate and t=residence time in charger.

14. Apparatus of claim 5, wherein the charger is cylindrical and has a diameter Dc=(4Qst/π)⅓, where Qs=Flow rate and t=residence time in charger.

15. Apparatus of claim 11, wherein the charger is cylindrical and has a diameter $Dc=(4Qst/\pi)^{1/3}$, where $Qs$=Flow rate and $t$=residence time in charger.

16. Apparatus of claim 12, wherein the charger is cylindrical and has a diameter $Dc=(4Qst/\pi)^{1/3}$, where $Qs$=Flow rate and $t$=residence time in charger.

* * * * *